Figure 1:
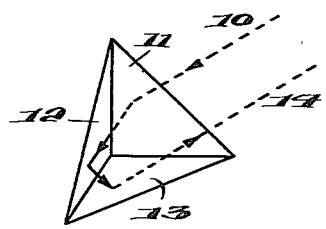

May 21, 1957 S. ÖBERG 2,793,362
REFLECTOR SYSTEM INTENDED FOR RADAR PURPOSES
Filed April 13, 1951 3 Sheets-Sheet 1

INVENTOR
SVEN OBERG,
BY Robert B Larson
ATTORNEYS

May 21, 1957 S. ÖBERG 2,793,362
REFLECTOR SYSTEM INTENDED FOR RADAR PURPOSES
Filed April 13, 1951 3 Sheets-Sheet 2
Fig.5.
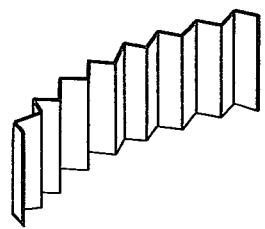
Fig.6.
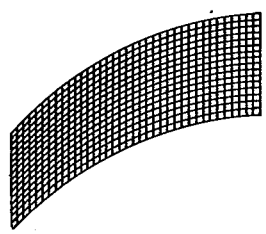
Fig.7.
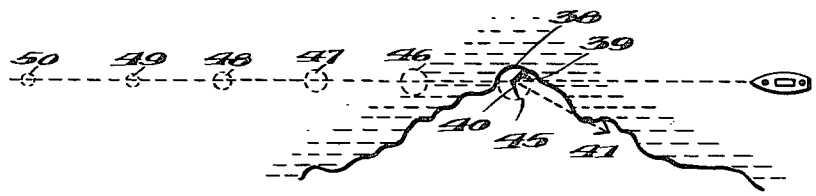
Fig.8.
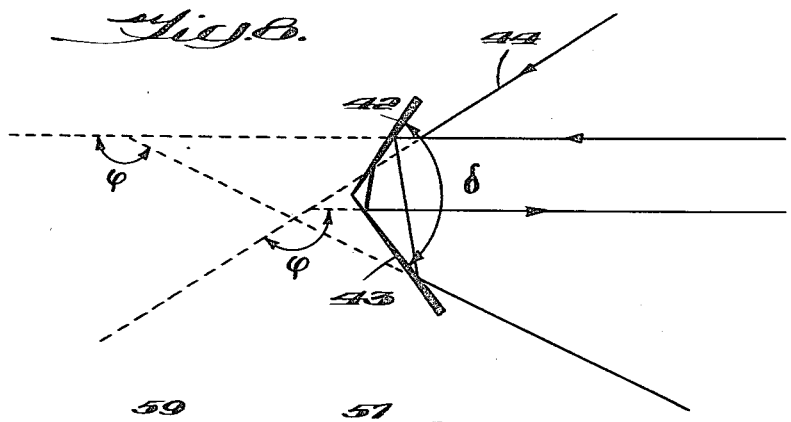
Fig.9.
INVENTOR
SVEN ÖBERG,
BY Robert B Pearson
ATTORNEYS May 21, 1957  S. ÖBERG  2,793,362
REFLECTOR SYSTEM INTENDED FOR RADAR PURPOSES
Filed April 13, 1951  3 Sheets-Sheet 3

INVENTOR
SVEN OBERG,
BY
ATTORNEYS

United States Patent Office 2,793,362
Patented May 21, 1957

2,793,362

REFLECTOR SYSTEM INTENDED FOR RADAR PURPOSES

Sven Öberg, Stockholm, Sweden, assignor to Svenska Aktiebolaget Gasacumulator, Lidingo (near Stockholm), Sweden, a corporation of Sweden Application April 13, 1951, Serial No. 220,757

16 Claims. (Cl. 343—18)

This invention relates to navigation devices and more particularly to devices by which the position of objects can be located through the use of radar.

According to the broad principle of radar, a pulsed signal of a very high frequency is transmitted by a rotating antenna so as to scan the area adjacent the transmitter. Objects in the area will reflect the signal back to the transmitter to give an indication of the presence of the object. The reflected beam is directed to a cathode ray oscilloscope whose electron beam is constantly sweeping the scope in synchronism with the movement of the antenna. The intensity of the electron beam is influenced by the reflected radar wave, so that, for example, the electron beam is fully or partly suppressed when no reflected beam is received but obtains full intensity when a reflected beam is received.

Thus, the oscilloscope will indicate the position of the objects causing the reflection of the input of the radar beam.

The angular position on the screen will be determined by the angular position of the transmitter antenna. The indication on the screen of the distance of the object from the transmitter will be dependent upon the time required for the signal to be transmitted to the object and then reflected back to the transmitter.

The principles outlined above have been utilized as navigational aids for airplanes, ships and the like. One arrangement proposed involves the use of so-called radar reflectors. Such a reflector in its simplest form may consist of a metal disk for reflecting a radar beam as described above. As a rule the disk is not completely satisfactory because only in exceptional cases will it reflect a beam back to the transmitter. A better solution of the reflector problem is obtained by arranging two reflector plates at an angle to each other, and one of the best solutions consists in the arrangement of three reflector plates built together as a pyramid. These reflectors will function in the same way as the total reflecting pyramid known in the optical art.

These reflector arrangements, however, have the disadvantages that they will cause only a single point to be received on the oscilloscope screen and the single point is difficult to separate and distinguish from other points inadvertently received on the screen. Nor has it been possible with such known arrangements for the operator to identify the particular reflector being observed.

It is the object of the present invention to provide a reflector arrangement by which the operator can easily distinguish the reflector being observed from random spots on the radar screen, and further to provide a code by which each reflector can be identified by the operator.

This and other objects are accomplished by a reflector system which operates entirely on signals reflected from objects constructed and arranged according to the present invention.

Figure 2:
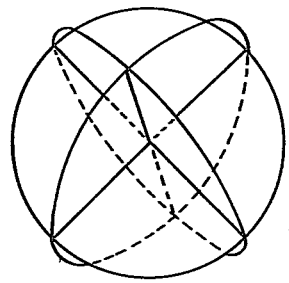
Figure 3:
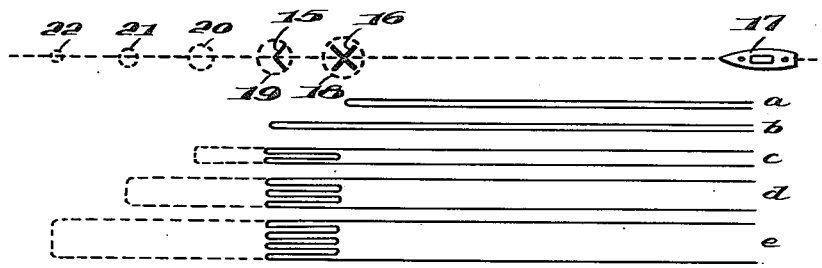
Figure 4A:
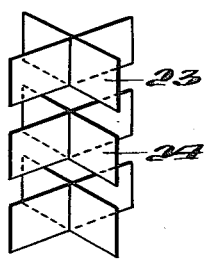
Figure 4B:
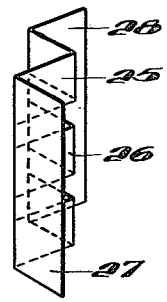
Figure 7A:
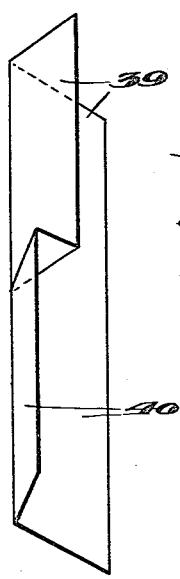

The invention is further described in connection with the attached drawings in which:

Figs. 1 and 2 indicate the general principle of the pyramidic radar reflector,

Fig. 3 is a diagrammatic view of a reflector arrangement illustrating the principle of the invention, Figs. 4a and 4b are diagrammatic perspective views of reflectors which may be used in the arrangement of Fig. 3, Figs. 5 and 6 are perspective views of reflectors, Fig. 7 is a diagrammatic view of a further modification of the arrangement of Fig. 3, Figs. 7a and 8 are diagrammatic views illustrating the reflector to be used in the system of Fig. 7, Figs. 9 to 12 are diagrammatic views of further embodiments.

Fig. 1 shows a known radar reflector which operates according to the pyramidic principle. The reflector is constructed from three reflector screens 11, 12 and 13 connected together as sides of a pyramid with the angular relationship of the sides so designed that an input signal wave will always be reflected backwards in its own input direction. The angular relationships are known from the optical total reflecting pyramid. Thus, for instance, the beam 10 is first reflected against the side 11, thereafter against side 12 and finally against side 13. Thereafter, the beam returns in its own intial direction as beam 14.

Fig. 2 shows an arrangement consisting in eight reflectors of the type shown in Fig. 1 mounted together to a spherical body. This arrangement has proved to be very effective even for marine navigation purposes in which the two vertically directed pyramid openings are not effective.

In the arrangement shown in Figs. 1 and 2, the input wave will be reflected back in the direction from which it originated regardless of its angle of approach to the reflector. When the wave comes in at an angle to all three sides, the reflection will take place from all three surfaces. On the other hand, if the input beam is parallel to one of the sides, only two reflections, from the remaining two sides, will be necessary to return the beam back to its source. Therefore, if it is known in advance that the input signal will always be in the horizontal direction, it will be necessary to construct the reflector of only two screens having their planes extending in the vertical direction. The invention will be described in connection with such a reflector although it is to be understood that the invention may be used equally well with the total reflecting pyramid. In order to simplify the description still further, the disclosure will deal primarily with the navigation of ships, although it is further to be understood that the invention may be applied equally well to the navigation of aircraft and the like.

In all of the embodiments shown and described, it will be assumed that the reflector is mounted on solid ground so that it may have a predetermined fixed position and that the radar beam from the vessel strikes the reflector horizontally. If these conditions cannnot be satisfied, one skilled in the art can modify the arrangement to suit the particular need.

The principle of the invention is illustrated in Fig. 3. Two reflectors 15 and 16 are placed in fixed positions on two low rocks in an island group for example. The reflector 15 is a simple angular reflector consisting of two screens of the type referred to above. The reflector 16 is a combination of two such angular reflectors one directed toward reflector 15 and the other directed away from reflector 15. Further, reflector 16 is constructed so that a part of the radar beam will be reflected back to the source whereas the remaining part of the beam will pass beyond reflector 16 and will strike reflector 15.

It is assumed, for the purpose of describing this arrangement, that a vessel 17 is transmitting a radar pulse which will be reflected by reflectors 15 and 16 back to the vessel so that the position of the reflectors can be indicated on the radar scope.

The transmitted pulse is first reflected directly back to the vessel by the half of reflector 16 facing the vessel 17. The returning beam will create a picture on the radar scope indicating the place 18 in Fig. 3. Diagrammatically, this pulse propagation has been indicated at *a*.

A part of the wave passes through reflector 16 and strikes reflector 15 and returns to the vessel giving an indication of the position 19. The pulse propagation is indicated diagrammatically at *b*.

The part of the wave energy reflected by reflector 15, however, will hit the half of reflector 16 facing away from the vessel so that it is again reflected to the reflector 15 and then back to the vessel. The wave propagation is indicated at *c* but because of the longer propagation time the radar scope will appear to show a third position 20 indicating a propagation line illustrated by the dotted line at *c*. The indication is similar to the indication which would be obtained if a reflector had been placed at the position 20.

In this way, by repeated reflection or "imaging" a series of virtual reflector pictures are created on the radar scope. Two further such virtual reflector images have been indicated at 21 and 22 in Fig. 3 with the propagation diagrams at *d* and *e*, respectively.

Due to the loss of energy in the reflections, the virtual reflector images will be weaker as they are more remote in order until finally no more virtual images are visible. However, enough virtual images will appear so as to form a limited band of dots by which the position of reflector 16, for example, can very easily be determined and distinguished from random reflections which may appear on the radar scope.

As indicated above, it is important that reflector 16 does not fully shadow reflector 15 for then reflector 15 would be ineffective. Suitable reflector constructions which may be used for this purpose are shown in Figs. 4a and 4b. In the embodiment shown in Fig. 4a the reflector is formed by screens which are arranged in the form of an X and located in laminae vertically above each other. In the embodiment according to Fig. 4b the screens are arranged in the form of a W and positioned vertically with respect to each other. In both cases spaces are left between each X-formed or W-formed reflector so as to permit part of the transmitted beam to pass through the reflector.

Theoretically, it would appear that if the input beam were completely horizontal, no repeated reflections would take place since the wave passing through the space between two reflector laminae would be reflected by reflector 15 in such a direction that it would again pass out through the same space without striking the reverse side of reflector 16. However, this does not occur in reality because, upon passing the reflector 16, the wave disperses or deviates to give the wave a slightly vertical component. Further, some spreading of the radiation is obtained at the reflection in each reflector and thus also in reflector 15. This dispersion and spreading have in practical tests proved to be fully sufficient for providing the repeated virtual reflection images.

The reflector according to Fig. 4b is constructed so as to be a single unit by joining the outer ends of the laminae such as 25 and 26 by plates 27 and 28. This arrangement makes the reflector very easily transportable and further the construction is of such a kind that a plurality of reflectors may be laid directly upon each other so as to form a tight package which is advantageous during transportation.

In the embodiments shown in Figs. 4a and 4b the penetrability of the wave through reflector 16 is provided by leaving spaces between reflector and screens. Other arrangements may be provided, for instance by making the reflector of a wire network of suitable mesh width. It is also possible to form a combination of the solid reflector with the wire mesh reflector so as to resemble a reflector according to Figs. 4a or 4b.

The distance between the two reflectors 15 and 16 is also important. With a radar system of normal quality and with usual wave lengths, a dissolution of the images created in the receiver can be obtained by spacing the reflectors for moderate distances such as 50 to 100 metres. If the distance between the reflectors is made less than the critical distance for dissolution, it is obvious that the reproduced images of the real or virtual reflectors will combine themselves into a line. On the other hand, if the distance between reflectors is greater than the critical distance, the images will appear as distinct dots on the radar scope.

The system described above is basic, but as shown would have a rather limited range of use as far as the formation of a band of virtual images is concerned. The band of virtual images can only be obtained if the vessel 17 is placed within a very limited angle so that the beam will strike both reflectors 16 and 15. The system of Fig. 3, however, may be used as a navigation bearing for an approaching channel or similar bearing line if the indication must take place with a high degree of accuracy. There may be need for such indication of lines in connection with marking of navigation channels, indicating of the running of cables and so on.

Figs. 5 and 6 show two types of cylindrical reflectors which can be used. In the reflector according to Fig. 5, a large number of angular reflectors are connected together so that their connecting lines will follow a cylindrical surface.

The reflector of Fig. 6 is constructed from a metal wire network and is advantageous in requiring a small consumption of material and in that it is light in weight, simple to produce and easy to transport.

The cylindrical reflectors, however, may be of a continuous metal surface. This may be formed either of a full metal plate or a perforated metal plate, or of wood which has been plated with metal foil or sprayed with a metallic paint. Other similar constructions could be made without departing from the scope of this invention.

The arrangement of Fig. 7 is designed to improve the degree of reflection of the system and/or to make it possible to arrange the reflector system with regard to varying topographical conditions.

In the arrangement of Fig. 7, it will be assumed that it is desired to make a dangerous portion of land which juts out into the water as indicated at 38 in Fig. 7. It will be seen that there is no possibility of locating a reflector at a point which would normally occur at 46. In this case, however, a reflector is located at 39 and a second reflector located at 41. The reflector 39 is illustrated in Fig. 7a and consists of a right angle reflector at the top and immediately below an obtuse or acute angle reflector 40. These reflectors cooperate with the reflector 41 which is of the right angle type.

The radar beam initially will strike the right angle portion of reflector 39 and be reflected back to the vessel giving an indication of the position of that reflector at 45. The beam will also strike the obtuse or acute angle reflector 40 and be reflected to the reflector 41, back to the reflector 40 and to the vessels. In this way, the virtual image 46 will be created.

Part of the beam sent back from the angular reflector 41, however, will not strike the wide angle reflector 40 but will strike the right angle portion of reflector 39. This beam will again be reflected in the direction of the reflector 41 and back to the reflector 40 and to the vessel. Thus, by repeated reflections between reflector 39 and 41 and ultimately the wide-angle reflector 40, a series of virtual images 47, 48, 49, 50 and so on will be created on the radar scope.

The operation of the wide-angle reflector 40 can be explained by reference to the schematic diagram in Fig. 8. The reflector is constructed of two reflecting screens 42 and 43. If an input beam has the direction 44, this will first be reflected against the screen 42 and then against screen 43, but because of the wide angle will not be returned in the direction from which it originated. Rather, it will take a direction differing from the input direction by the angle $\varphi$.

If the opening angle of the wide-angle reflector is $\delta$ it is obvious that the relation between the angle $\varphi$ and the angle $\delta$ will be:

$$\delta = 180° - \frac{\varphi}{2}$$

In the system according to Fig. 7, the right angle reflector 41 should, therefore, be placed in the horizontal plane in a direction from the reflectors 39, 40 which is separated from the direction of the input beam by an amount of $180° - \varphi$.

If the reflector 41 is positioned as described above, then the input beam will be reflected from the wide angle reflector 40 to the reflector 41 and then back toward the reflector 39 or 40 along the original path.

Fig. 9 shows an example of indicating the free water in a sound. In two places on each bank of the sound, for instance placed exactly opposite each other, as two capes, reflectors are provided. Each reflector group contains one normal angle reflector 51 and 52, respectively, operable in the longitudinal direction of the sound and one normal angle reflector 53 and 54, respectively, operable in a direction perpendicular thereto. Additionally a wide-angle reflector 55 and 56 are placed at the side of these reflectors which has in the example shown an opening of 135°. The system, therefore, is fully symmetrical and its function may most readily be described with reference to one group of cooperating reflectors. This group is assumed to consist of the reflector 51 for indicating the first direct reflection, further the wide-angle reflector 55 for deviation of the beam into a 90 degree angle, so that it will hit the reflector 54 and finally the reflector 53 which will, together with the reflector 54, create the reversing beam.

In this way there is obtained a real image 57 and 58, respectively, and in the above described manner a band of virtual reflection dots 59 and 60, respectively, which will together indicate the navigable waters in the channel.

In practice, of course, it is suitable to make the two reflectors 51 and 53 or 52 and 54, respectively, in the form of one single group which is T-formed or X-formed in section.

It should be observed that there are obtained by the combination of reflectors described twice as close indication points as compared with the prior described systems. This is because there will be created one further point, emanating from double indication between each normally occurring indication point. One such point may be created by the radar beam being directed on to the reflector 55, being deviated from this reflector to the reflector 56 and re-radiated from this, so that it will visually indicate a virtual reflection dot in the band of dots 60. In this way the dot 61 was created. The dot 62 was created in a corresponding way, however after a running beam pendulum movement between the normal angle reflector 54 and the normal angle reflector 53.

Figure 10:
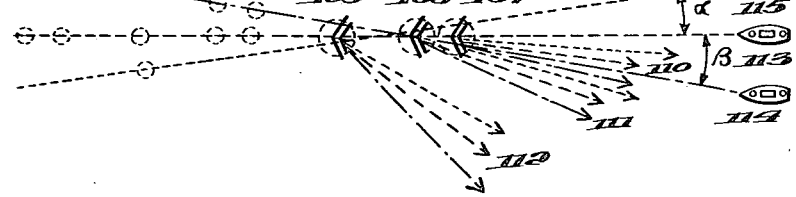

By providing three reflector groups successively with regular or irregular division one may obviously obtain codes which contain three dots and so on. Such a reflector system is schematically shown in Fig. 10. This contains three identical reflector groups of the basic type described in connection with Fig. 5, all of them thus being provided with the same distance between the reflectors 107, 108 and 109, respectively, arranged in the beam direction and the side reflectors 110, 111 and 112, respectively. On the other hand the distance between the reflectors 107 and 108 is smaller than the distance between the reflectors 108 and 109. If now the reflector 109 should be placed from the central point between the reflectors 108 and 107 a distance which is exactly half of the distance from each of the reflectors 107, 108 and 109 to the corresponding side reflector 110, 111 and 112, respectively, a periodically repeated indication will therefore be obtained on a vessel 113 in the bearing line. This indication will contain alternatively one and two dots as shown in the drawing.

The reflectors 110, 111 and 112 may be built up of angular reflecting surfaces to obtain a great width or may consist of cylindrical surfaces. Their width is such that the radar beam of a vessel 114 which is assumed to pass within one limit line of the allowed navigational angle will be subject to repeated reflection between the reflectors 107 and 110 and the reflectors 108 and 111, whereas, on the other hand, the beam after reflection against the reflector 109 is transmitted in a direction that falls outside of the level of the reflector 112 so that no repeated reflection will be obtained. The consequence thereof is that in the radar receiver of the vessel 114 there will be seen only a code of continually repeated double points. In a corresponding way, radar transmission from a vessel 115 in the other limit line of the navigational angle will cause repeated radiation between the reflectors 108 and 111. Consequently, in this last case only single points will be obtained in the radar receiver of the vessel.

In this way it is posible to provide navigation codes to the aid of the sailer. One may also provide dashes, eventually alternating with dots, if the mutual distance of the reflector groups in the direction of the input beam is less than the critical distance for dissolution of the picture.

Figure 11:
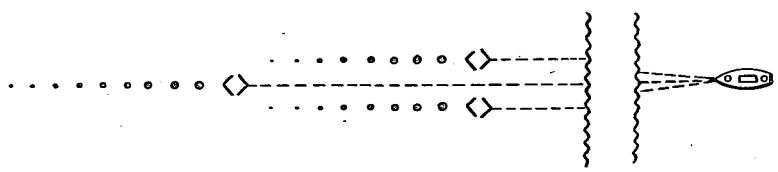
Figure 12:
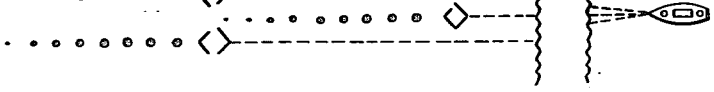

If desired, one may provide reflectors according to Fig. 11 in such a way that there are first two reflector groups arranged besides each other, for instance on each side of a channel, and a little further away one reflector group is provided in the middle of the channel. There are unlimited combination possibilities and practically they will automatically be apparent to the man skilled in the art in connection with the topographical and navigating circumstances present in each separate case. In this connection Fig. 12 shows a reversed arrangement of the reflector groups as shown in Fig. 11.

What is claimed is:

1. A reflector system intended for radar purposes comprising a first reflector unit for receiving a signal beam and reflecting a first portion of said beam back to its transmitter, a second reflector unit for receiving a second portion of said beam and reflecting part of said second portion back to its transmitter, said reflector units having cooperating reflecting surfaces disposed in beam aligned relationship to cause diminishing portions of said second portion of said beam to be reflected back and forth, at least a part of the remaining portions of diminishing portions of said second portion being directed back toward the transmitter.

2. A reflector system according to claim 1 in which the reflector units are disposed in a straight line.

3. A reflector system according to claim 1 in which at least one of the reflector units are provided as cylindrical reflectors.

4. A reflector system according to claim 1 in which at least one of the reflector units is an angle reflector, formed by at least two reflector plates.

5. A reflector system intended for radar purposes comprising, a first reflector including a wide angle reflector for receiving a signal beam and reflecting a first portion of said beam back to its transmitter, a second reflector located at the side of said first reflector for receiving a second portion of said beam from said first reflector, said wide-angle reflector and said second reflector having cooperating reflecting surfaces disposed in beam aligned relationship to cause diminishing portions of said second portion of said beam to be reflected back and forth, at least a part of the remaining portions of said second portion being directed back toward the transmitter.

6. A reflector system according to claim 5 in which there is disposed adjacent to said first wide-angle reflector a square-angle reflector for direct reflection of the input radar beam.

7. A reflector system intended for radar purposes comprising, a first group of reflectors including a first reflector for receiving a signal beam and reflecting a first portion of said beam back to its transmitter, a second reflector for receiving a second portion of said beam from said first reflector, said reflectors having cooperating reflecting surfaces disposed in beam aligned relationsip to cause diminishing portions of said second portion of said beam to be reflected back and forth, at least a part of the remaining portions of said second portion being directed back toward the transmitter; and at least a second group of reflectors like said first group of reflectors and cooperating with said first group to indicate a complicated radar picture.

8. A reflector system according to claim 7 in which said two groups are disposed beside each other for creating two indicated bearing or piloting lines beside each other.

9. A reflector system according to claim 7 in which at least one of the reflectors in the groups is common to both of the groups.

10. A reflector system according to claim 7 in which the first and second reflectors of each group are spaced the same distance from each other to provide the same length of path for repeated reflection and the groups are spaced from each other by distances along the direction of the radar beam which differ from the length of said reflection path in order to create a code-like grouping of the reflections.

11. A reflector system according to claim 10 in which at least three groups are provided in the direction of the radar beam differing in the distances from each other so that when a radar transmitter deviates sidewards from the bearing line of the system, the radar beam will hit less than the full number of groups in such a direction that there is obtained repeated reflection, different code-like groupings thereby being obtained in the bearing line and on one and the other side thereof, respectively.

12. A reflector system according to claim 1 in which said first reflector unit consists at least partly of angle reflectors comprising bands which are arranged above each other in the same vertical plane so that openings are created between the bands for letting part of the input beam energy through.

13. A reflector system according to claim 12 in which the band formed reflectors have the form of an X.

14. A reflector system according to claim 1 in which the reflector units consist at least partly of cylindrical bowed surfaces.

15. A reflector system according to claim 14 in which the cylindrical bowed surface formed reflector units consist of wire net with a mesh width such that a portion of the beam energy penetrates the reflector unit.

16. A reflector system according to claim 1 in which at least part of said reflector units comprise cylindrical bowed surfaces consisting of reflectors bent in repeated angles in which the bending lines have the position of generatrix lines.

References Cited in the file of this patent
UNITED STATES PATENTS

| | | |
|---|---|---|
| 2,465,993 | Beechlyn | Apr. 5, 1949 |
| 2,498,660 | Dunmore et al. | Feb. 28, 1950 |
| 2,532,539 | Counter et al. | Dec. 5, 1950 |
| 2,534,716 | Hudspeth et al. | Dec. 19, 1950 |
| 2,538,035 | Pickles | Jan. 16, 1951 |
| 2,539,511 | Hansen et al. | Jan. 30, 1951 |
| 2,692,984 | Cohn | Oct. 26, 1954 |